Aug. 5, 1930.                    I. ISEMAN                    1,772,395
                              COUPLING DEVICE
                            Filed April 10, 1929
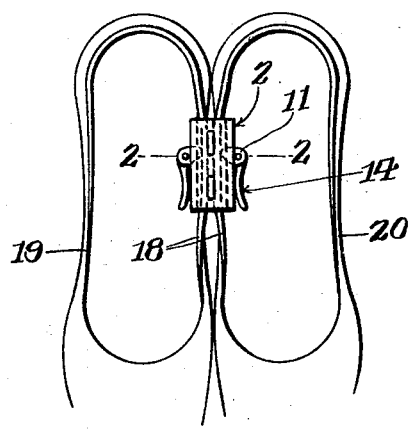
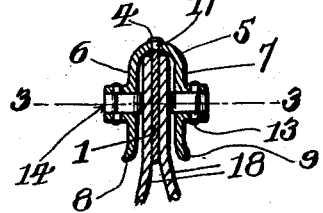
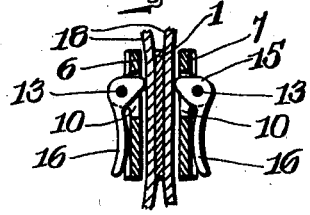
INVENTOR.
Isaac Iseman,
BY Geo. F. Kimmel
ATTORNEY.

Patented Aug. 5, 1930

1,772,395

UNITED STATES PATENT OFFICE

ISAAC ISEMAN, OF WASHINGTON, DISTRICT OF COLUMBIA, ASSIGNOR, BY MESNE ASSIGNMENTS, OF ONE-HALF TO SAMUEL SELVIN WEISBERG, OF WASHINGTON, DISTRICT OF COLUMBIA

COUPLING DEVICE

Application filed April 10, 1929. Serial No. 354,066.

This invention relates to a coupling device in the form of a clasp and is designed primarily for detachably securing a pair of shoes together, but it is to be understood that a coupling device, in accordance with this invention may be employed for any purposes for which it is found applicable, and the invention has for its object to provide, in a manner as hereinafter set forth, a coupling device capable, when used to detachably secure a pair of shoes of like size and style in coupled relation to prevent the separation thereof when displayed for sale or show purposes.

As is well known, shoes are sent from the factory boxed in pairs, that is to say, each pair of shoes of like size and style is encased in a box for convenient storing and handling by a salesman, but when a lot of shoes are displayed on a counter for a sale, the shoes are generally removed from the boxes, but the shoes of a pair of like size and style are not connected together. Handling of the shoes of the lot by customers cause a mix up and disarrangement relative to sizes and style resulting in the loss of considerable time by a salesman or customer to endeavor to match up a pair of shoes. This is very objectionable and oftentimes loses a sale. To overcome this objectionable feature, is the primary object of the invention and which is attained by the employment of a thoroughly efficient device, in accordance with this invention to detachably couple together a pair of shoes of like size and style to prevent the separation thereof under normal conditions when examining and handling the same.

Further objects of the invention are to provide, in a manner as hereinafter set forth, a coupling device which is simple in its construction and arrangement, strong, durable, compact, thoroughly efficient for the purpose intended, conveniently arranged in coupling position for detachably securing a pair of shoes together, not maring in any manner the shoes when in coupling position, not objectionable in appearance, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of a pair of shoes showing the adaptation therewith of a coupling device in accordance with this invention for detachably securing the shoes together.

Figure 2 is a section on line 2—2 Figure 1.

Figure 3 is a section on line 3—3 Figure 2.

Figure 4 is a perspective view of the form of coupling device shown in Figures 1, 2 and 3.

Figure 5 is a cross sectional view illustrating a modified form of coupling device.

Figure 6 is a longitudinal sectional view of still another modified form of coupling device.

Figure 7 is a vertical sectional view of the form of coupling device shown in Figure 6.

Figures 8 and 9 are perspective views illustrating the form of coupling device shown in Figures 6 and 7.

Each of the several forms of coupling devices as shown, comprises a two part or sectional body portion, and with the latter provided with a pair of clamping levers of the cam type.

With reference to Figures 1, 2, 3 and 4 one of the sections of the body portion of the device is indicated at 1 and the other section at 2. The section 1 is formed of a plate of the desired height and width and is provided at its top with a pair of bendable tongues 3, 4. The section 1 is constructed of suitable metallic material.

The section 2 is of inverted U-shape and comprises a top 5 of arcuate form and a pair of arms 6, 7 which correspond in width to the width of the section 1. The arms 6, 7 at their lower ends are flared in opposite directions as indicated at 8, 9. Each of said arms at a point between its vertical median and a side edge is provided with an opening 10 and at the top and bottom of such opening each of said arms is formed with laterally extending, superposed, spaced, apertured lugs 11, 12. Fixed to each pair of lugs is a vertically disposed pivot 13 for a clamping lever 14.

The lever 14 includes a cam head 15 which is eccentrically mounted on a pivot 13 and the head 15 at its outer end has extending therefrom a curved handle 16. The levers carried by the arms 6, 7 are oppositely disposed with respect to each other and the heads thereof extend inwardly through the openings 10 and towards the section 1, the latter being arranged between the arms 6, 7 and in spaced relation therewith.

The section 1 abuts against the lower face of the top 5 of section 2 and said top 5 is provided with a pair of spaced openings 17 through which extend the bendable tongues 3, 4. The tongues are bent against the upper face of the top 5 whereby the sections 1 and 2 are detachably connected together to provide a pair of spaces for the insertion of a pair of articles to be detachably coupled together. The section 1, when the articles are inserted in the device maintain the articles in spaced relation. The section 2 is formed of suitable metallic material.

The device shown in Figure 1 is adapted to be positioned upon the inner side 18 of the uppers of a pair of shoes 19, 20 and with a portion of the upper of the shoe 19 extended between the arm 6 and section 1 and with a portion of the upper of the shoe 20 extended between the arm 7 and section 1. The clamping levers 14 are then swung to the position shown in Figure 3 whereby the heads 15 will tightly clamp the inner sides 18 of the uppers of the shoes against the section 1 under such conditions the shoes of the pair are detachably secured together.

In the form shown in Figure 5, the body portion of the device is formed of two inverted, U-shaped sections 21, 22 each including an inner arm 23, an outer arm 24 and a top 25. The bottoms of the arms of each section are flared in opposite directions as indicated at 26, 27. The outer arm of each section is provided with an opening 28 and a pair of laterally extending, spaced, superposed, apertured lugs 29 to which is fixedly secured a pivot 30, and the latter is vertically disposed and is provided for pivotally connecting a clamping lever 31 to a body or section. The lever 31 is of the same form as the levers 14.

Carried by the inner arms of the sections 21, 22 is a snap fastener element 32 for the purpose of detachably connecting the body sections together. The inner sides 18 of the uppers of the pair of shoes are adapted to be positioned within the sections 21, 22 and are detachably secured or clamped to the inner arms 27 of such sections by the clamping levers 31 when such levers are moved to a position similar to that shown in Figure 3.

The form of coupling device shown in Figures 6, 7, 8 and 9 is the same as that referred to with respect to Figure 5, with this exception that the inner arm 33 of body section 34 and the inner arm 35 of body section 36 are formed with different means for detachably connecting the body sections together, that is to say, the means shown in Figures 6 to 9 for detachably connecting the body sections together is different from that as shown in Figure 5.

In the form shown in Figures 6 to 9 the inner arm 33 is provided with a laterally disposed, channel shaped extension 37 adapted to receive an offset tongue 38 carried by the inner arm 35 of section 36 to provide for detachably connecting said sections 34 and 36 together. The tongue 38 is resilient so as to set up frictional engagement with the extension 37 when the body sections are detachably connected together. Otherwise than that as stated the form shown in Figures 6 to 9 is the same as that shown in Figure 5. In Figures 6 to 9 the outer arms of the body sections 34, 36 are indicated at 39, the lugs on such arms at 40, the pivots at 41 and the clamping levers at 42.

In the form shown in Figure 1, to detach one shoe from the other, when desired the clamping lever is shifted to released position, whereas with respect to the other forms to release one shoe from the other one body section is detached from the other.

It is thought the many advantages of a clutching device in accordance with this invention and for the purpose referred to, can be readily understood, and although the preferred embodiment of the invention is as illustrated and described, yet it is to be understood that changes in the details of construction can be had which fall within the scope of the invention as claimed.

What I claim is:

1. A coupling device comprising a body portion for receiving a pair of objects to be detachably secured together in spaced relation and formed of two sections, means for connecting said sections together, said body portion formed with openings, pivots carried by the body portion and extending across said openings, and clamping levers having cam shaped heads eccentrically mounted for swinging movement on said pivots, extending through said openings and directly engaging said objects to detachably secure them against said body portion.

2. A coupling device comprising a body portion for the insertion of a pair of articles to be detachably connected together in spaced relation and formed of two sections, one of said sections being of inverted U-shape and the other formed of a single length of material, positioned within, spaced from the sides of and having its inner end secured directly to the bend of the U-shaped section, the spacing of the section formed of a single length of material from the sides of the U-shaped section providing a pair of recesses for the insertion of the articles to be coupled, each side of said U-shaped section being formed with an opening and a pair of opposed, spaced, outwardly directed, apertured, lateral lugs, and means pivotally connected to said lugs and extendible through said openings and directly engaging with the inserted articles for clamping them against that section formed from a single length of material.

3. A coupling device comprising a body portion provided with a pair of recesses for the insertion of a pair of articles to be detachably connected together in spaced relation, said body portion formed of two sections, means for connecting said sections together, said body portion formed with openings and with outwardly extending, opposed, lateral lugs carrying pivots extending across said openings, and clamping levers each having one end thereof concentrically pivoted to said body portion, said end being for extension through said openings when the levers are shifted to clamping position to directly engage and detachably secure said object to the body portion, and said sections of said body portion maintaining said objects in spaced relation when the objects are detachably secured together.

4. A coupling device for detachably connecting together a pair of articles in spaced relation and comprising a body portion formed with a pair of recesses for the insertion of the articles to be detachably coupled together, said body portion being formed with openings and pivots extending across said openings, and clamping levers eccentrically mounted on said pivots and extendible through said openings to directly engage said articles to clamp them directly against said body portion whereby the articles are detachably connected together.

5. A coupling device for detachably connecting together a pair of articles in spaced relation comprising a body portion formed with a pair of recesses for the insertion of the articles to be detachably coupled together, said body portion being further formed with a pair of openings and two pairs of apertured lugs, the lugs of each pair being arranged in opposed, spaced relation and projecting outwardly from the body portion, a pivot fixed to each pair of lugs, and a pair of clamping levers eccentrically mounted on said pivots and extendible through said openings to directly engage said articles to clamp them directly against said body portion whereby the articles are detachably coupled together.

In testimony whereof, I affix my signature hereto.

ISAAC ISEMAN.